United States Patent [19]

Corvaglia et al.

[11] Patent Number: 5,009,587
[45] Date of Patent: Apr. 23, 1991

[54] INJECTION MOLDING MACHINE FOR MAKING TUBULAR WORKPIECES FROM PLASTIC MATERIAL

[75] Inventors: Romeo Corvaglia, Ramsen; Martin Schöttli, Schaffhausen, both of Switzerland

[73] Assignee: Schottli AG, Diessenhofen, Switzerland

[21] Appl. No.: 455,767

[22] Filed: Dec. 28, 1989

Related U.S. Application Data

[63] Continuation of Ser. No. 259,327, Oct. 18, 1988, abandoned.

[30] Foreign Application Priority Data

Oct. 31, 1987 [CH] Switzerland ............... 4257/87

[51] Int. Cl.$^5$ ............................................ B29C 45/22
[52] U.S. Cl. ............................ 425/549; 264/297.1; 264/328.8; 264/328.12; 264/328.15; 425/556; 425/570; 425/572; 425/577; 425/588
[58] Field of Search ........... 264/328.8, 328.12, 328.14, 264/DIG. 67, 297.1, 328.15; 425/547, 548, 549, 567, 568, 569, 570, 572, 573, 577, 581, 588, 556

[56] References Cited

U.S. PATENT DOCUMENTS

| 2,551,439 | 5/1951 | Kovacs | 425/547 |
| 2,871,517 | 2/1959 | Allard | 425/570 |
| 2,878,517 | 3/1959 | Cramer | 264/DIG. 67 |
| 3,671,159 | 6/1972 | Greenberg et al. | 425/573 |
| 4,184,836 | 1/1980 | Rees | 405/581 |
| 4,761,343 | 8/1988 | Gellert | 425/570 |

FOREIGN PATENT DOCUMENTS 186413 7/1986 European Pat. Off. ........... 425/573
909555 3/1961 United Kingdom .

OTHER PUBLICATIONS

Spritzgiesswerkzeug zur Hersteillung dunnwand iger Hulsen.

Primary Examiner—Timothy Heitbrink
Attorney, Agent, or Firm—Peter K. Kontler

[57] ABSTRACT

An injection molding machine for the making of barrels of syringes has first and second mold sections which have confronting surfaces and one of which is movable between operative and retracted positions in which the surfaces respectively abut and are spaced apart from each other. The first section has cylindrical bores each of which is open at the respective surface and extends to an end wall adjacent a nozzle with several uniformly distributed orifices which admit heated plasticized material into the bore when the two surfaces abut. The second section has cores each of which extends into a bore in the operative position of the one section to define with the first section a cavity for reception of plasticized material. The first section has coolant-conveying channels which concentrically surround the bores, and the first section has flow restricting ports which connect the discharge ends of the orifices with the respective cavities. The means for heating the plasticized material during flow in the first section do not extend beyond the surfaces surrounding the respective bores of the first section. This renders it possible to place the bores and the nozzles close to each other.

18 Claims, 3 Drawing Sheets

INJECTION MOLDING MACHINE FOR MAKING TUBULAR WORKPIECES FROM PLASTIC MATERIAL

This application is a continuation, of application Ser. No. 259,327, filed Oct. 18, 1988, now abandoned.

BACKGROUND OF THE INVENTION

The invention relates to improvements in machines for processing plastic materials, and more particularly to improvements in injection molding machines. Still more particularly, the invention relates to improvements in machines for making tubular workpieces (such as cylindrical barrels of syringes) from plastic material which is injected into a cavity defined by a mold body and a core.

It is known to make the barrels of disposable syringes from a plastic material which is injected into the cavity between a core and a mold body in such a way that plasticized material enters the cavity in the region for the formation of the front end wall of the barrel, namely in the region of the end wall which carries the tubular extension or tip for the rear end of the hollow needle. The machine which can be used for such purposes can include a mold of the type known as cold runner mold or partly hot runner mold. A drawback of such proposal is that the barrel which is formed as a result of setting of plasticized material in the cavity invariably contains a sprue (waste portion). The sprue must be separated from the barrel and processed which normally involves classification and grinding for reuse of the plastic material. The mold must be designed to permit opening in two planes, namely in a first plane for the purpose of separating the sprue and in a second plane for the purpose of evacuating the barrel from the cavity. This necessitates the provision of a bulky mold.

In accordance with another prior proposal for the making of disposable syringes, plasticized material which is to form the barrel of the syringe is injected into the cavity of a hot runner mold in the region of the rear end of the barrel, namely at that end of the barrel from which the plunger or the piston rod extends when the syringe is fully assembled. This reduces the likelihood of the formation of sprue; however, air which must leave the cavity in response to injection of plasticized material can be expelled only along the narrow path which includes the hole in the tip or extension for the hollow needle of the syringe, i.e., by way of the central opening in the front end wall of the barrel. Abrupt expulsion of air from the cavity along such narrow path results in excessive heating of the customary pin which is installed in the mold to define the hole in the extension of the front end wall of the barrel. This often entails charring of the adjacent portion of the barrel so that the barrel must be discarded. In addition, it is necessary to inject plasticized material at a very high pressure in order to ensure that the expulsion of air from the cavity of the mold will be completed within a short interval of time. This contributes to the energy requirements and overall cost of the injection molding machine.

Another drawback of the just described molds for the making of barrels for syringes and like tubular objects is that the orifices which admit plasticized material into the cavity must extend all the way to the rear end of the cavity, i.e., to the end which is remote from the front end wall of the barrel. Since the plasticized material in the orifices is heated, the heating means must extend along the entire cavity so that the space requirements of such heating means are excessive. Therefore, the separable sections of the machine can define only a rather small number of cavities for simultaneous making of several barrels because the mutual spacing of neighboring cavities cannot be reduced at will in view of the need for heating means around each cavity and the respective orifices for admission of plasticized material. Still further, the heating means cannot be placed at a uniform distance from all portions of each cavity so that the material in the cavities undergoes a non-uniform heating action. This, in turn, entails undue deformation of the plastic objects because after shrinkage of material in a cavity is more pronounced in regions where the confined material was heated to a higher temperature.

As a rule, the means for heating plasticized material in the cavities of the aforedescribed hot runner molds is designed in such a way that several (e.g., four) closely adjacent molds are heated by a common heating unit which can include one or more heating rods. This exhibits the drawback that, if a heating unit is out of commission, all of the molds which are supposed to be heated by the defective unit are out of commission until after the defective unit is repaired or replaced. Such mode of heating groups of molds by common heating units can result in huge losses in output, for example, if a heating unit is damaged immediately after the start of a shift and the repair work cannot be carried out until after the shift is completed.

U.S. Pat. No. 4,184,836 to Rees discloses a multiple mold for producing elongated tubular articles. The mold body has several recesses for reception of discrete cores to define individual mold cavities. The arrangement is such that four cavities receive plasticized material from a common nozzle which is disposed between the recesses of the respective group. In order to ensure rapid distribution of plasticized material in the four cavities, the end walls of the tubular articles which are formed in the cavities are non-symmetrical, i.e., the extensions or tips for the rear end portions of the needles resemble inclined cones. If the articles are barrels of syringes, syringes embodying such barrels exhibit the drawback that their contents cannot be fully expelled in response to depression of the respective plungers. Moreover, admission of plasticized material from one side of the core in each recess entails a lateral shifting of the cores in response to the pressure of injected plasticized material, i.e., the thickness of the cylindrical walls of the barrels is not uniform which renders the barrels defective or, at the very least, unacceptable for certain applications.

British Pat. No. 909,555 to Rosedale discloses a method of producing thermoplastic tubes in a cold runner mold. Plasticized material is injected at the closed end of the cavity in the region where the material is to form the extension for reception of the needle. This mold exhibits the aforediscussed drawbacks, particularly the need for opening the mold in several planes in order to separate the sprue and to permit ejection of articles from their cavities.

U.S. Pat. No. 2,878,517 to Cramer discloses a mold for annular plastic articles wherein plasticized material must be injected along the entire inner portion of the cavity and the film-like sprue must be separated upon expulsion of the annular article from the cavity. This entails extensive secondary treatment of articles and involves removal of relatively large quantities of waste material, the same as in all machines which employ cold runner molds.

German-language article by Jörg Gaiser entitled "Spritzgusswerkzeug zu Herstellung dünnwandiger Hulsen" (Injection molding tool for the making of thin-walled sleeves) published in "Der Plastverarbeiter" (1974, Volume 25, No. 80, pages 473–475) proposes to mechanically hold the core during injection of plasticized material so as to ensure that the wall thickness of tubular articles will be uniform. The author proposes to inject plasticized material by way of two orifices and to form a so-called tunnel sprue which can be removed only if the mold is separable in a plurality of planes. The separated sprue must be ground for renewed use.

OBJECTS OF THE INVENTION

An object of the invention is to provide a novel and improved injection molding machine for the making of tubular articles, such as barrels of syringes, in such a way that the machine must be opened in a single plane and produces no sprue and therefore no waste of material.

Another object of the invention is to provide a novel and improved mold for use in the above outlined machine.

A further object of the invention is to provide a mold which ensures uniform cooling of the articles even though the core need not be mechanically centered in the cavity for reception of plasticized material.

An additional object of the invention is to provide novel and improved means for supplying plasticized material to the cavity of the above outlined mold.

Still another object of the invention is to provide novel and improved heating means for plasticized material which flows toward the mold cavity.

A further object of the invention is to provide a mold wherein a large number of cavities can be distributed in a small area in immediate or close proximity to each other.

An additional object of the invention is to provide a novel and improved method of admitting plasticized material into the cavities for the making of tubular articles, such as barrels of syringes.

Another object of the invention is to provide a novel and improved hot runner mold.

A further object of the invention is to provide a novel and improved mold for the making of tubular articles in a time- and space-saving manner.

Another object of the invention is to provide a method of making barrels for syringes and like tubular articles with a degree of precision which cannot be matched by presently known methods of making such articles.

A further object of the invention is to provide a novel and improved method of making barrels of syringes and like tubular articles.

Another object of the invention is to provide barrels for syringes or like tubular articles which are produced in the above outlined apparatus and in accordance with the above outlined method.

SUMMARY OF THE INVENTION

The invention is embodied in a mold which can be used in an injection molding machine, particularly for the making of barrels of syringes and other tubular articles. The mold comprises a first and a second mold section. The two sections have confronting surfaces and at least one of the sections is movable between operative and retracted positions in which the surfaces respectively abut and are spaced apart from each other. The first section has at least one recess with an open end at the respective surface and a second end remote from the open end, and an end wall at the second end. The improved mold further comprises at least one core which is provided on and extends from the surface of the second section and is received with play in the recess in the operative position of the one section so that the core and the first section then define a tubular mold cavity. Still further, the mold comprises means for supplying plasticized material into the cavity, and such supplying means includes nozzle means carried by the first section adjacent the end wall and being in line with the recess. The nozzle means has a plurality of orifices for admission of plasticized material into the cavity in the region of the end wall.

The orifices have discharge ends adjacent the second end of the recess which latter can include a cylindrical bore or hole. The nozzle means is at least substantially coaxial with the bore or hole which forms part of or constitutes the recess. The first section preferably includes an insert which constitutes a mold body and defines the recess.

The supplying means further comprises a support for the nozzle means, and such support preferably includes a portion which is remote from the end wall of the first section and is affixed to the aforementioned portion of the nozzle means.

The supplying means can further comprise flow restrictor means defining paths for the flow of plasticized material from the discharge ends of the orifices into the cavity. Each of the flow restrictor means can include a port which is provided in the first section and communicates with the cavity, and a projection provided on the nozzle means and extending into the respective port. If the recess includes or constitutes a substantially cylindrical bore or hole, the ports are or can be disposed substantially radially of the bore or hole.

The supplying means can further comprise a distributor which is removably installed in the first section of the mold and mounts the support for the nozzle means. The cross-sectional area of the mold body or insert of the first section preferably equals or approximates the cross-sectional area of the support, i.e., the support need not extend beyond the mold body in the radial direction of the bore or hole.

The supplying means preferably further comprises means for heating the plasticized material, and such heating means can be adjacent the aforémentioned end wall of the first section of the mold. The heating means can be provided in or can include a portion which is installed in the nozzle means substantially in line with the mold body. Alternatively, or in addition to such portion, the heating means can include a portion which is installed in the support substantially in line with the mold body. Still further, the heating means can include a portion which is installed in the distributor for the support and is at least substantially in line with the mold body.

The mold can further comprise means for cooling the plasticized material which is admitted into the cavity, and such cooling means can surround the recess.

The end wall of the first section can be provided with a socket which communicates with the recess to receive plasticized material by way of orifices in the nozzle means. The material which enters the socket can constitute the aforementioned extension or tip of the barrel of a syringe.

One of the sections can be disposed at a level above the other section of the mold.

The recess can include an enlarged portion in the surface of the first section, and the material which enters and fills such enlarged portion in the operative position of the one section constitutes a flange at the open end of the tubular article which is formed as a result of cooling of plasticized material in the cavity.

As a rule, the first section will be provided with at least one additional recess which extends inwardly from the respective surface, and such mold further comprises at least one additional core provided on the second section and receivable in the additional recess in the operative position of the one section to define with the second section an additional cavity. The first section has an additional end wall at the second end of the additional recess, and the mold further comprises means for supplying plasticized material to the additional cavity.

The novel features which are considered as characteristic of the invention are set forth in particular in the appended claims. The improved injection molding machine itself, however, both as to its construction and its mode of operation, together with additional features and advantages thereof, will be best understood upon perusal of the following detailed description of certain specific embodiments with reference to the accompanying drawings.

DESCRIPTION OF PREFERRED EMBODIMENTS

Figure 1:
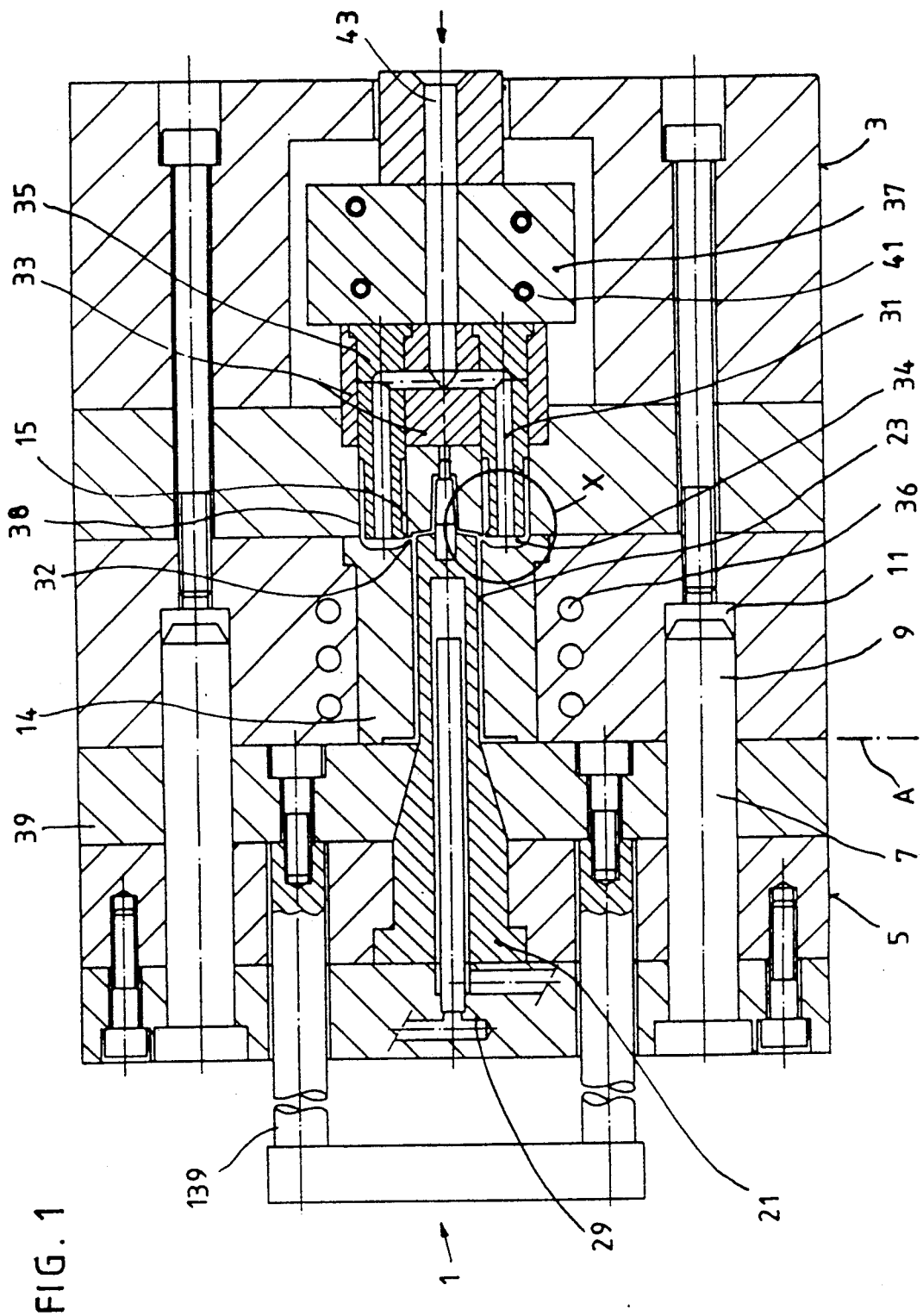
FIG. 1 is a sectional view of a mold forming part of the improved injection molding machine, the one section of the mold being shown in the operative position.
Figure 2:
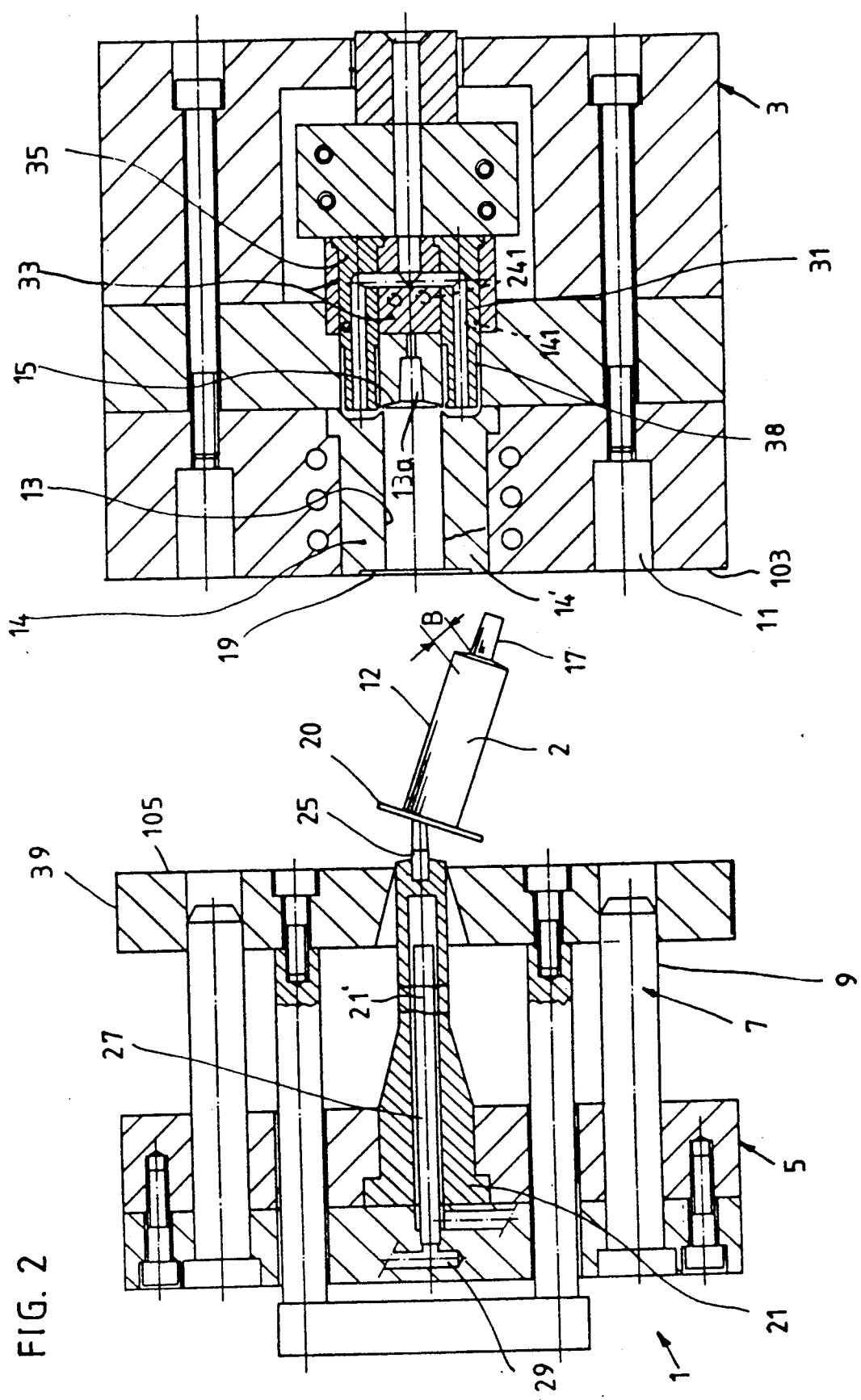
FIG. 2 shows the structure of FIG. 1, with the one section in retracted position and a freshly formed tubular article between the two sections of the mold.

FIGS. 1 and 2 show a mold 1 which forms part of an injection molding machine and comprises a first mold section 3 and a second mold section 5. It is assumed that the second section 5 is movable relative to the first section 3 along a straight path which is defined by several parallel guide members 7 affixed to the section 5 and having projecting portions 9 receivable in complementary bores or holes 11 of the section 3. The means for moving the section 5 between the operative position of FIG. 1 (in which the surface 105 of the section 5 abuts the surface 103 of the section 3 in a plane A) and the inoperative or retracted position of FIG. 2 in which the surfaces 103, 105 are spaced apart is of conventional design and is not shown in the drawing. When the section 5 is retracted, a reciprocable ejector 39 can be actuated to separate a freshly formed tubular article 2 from the core or mandrel 21 of the section 5. This is achieved by causing two pushers 139 to move relative to the section 5 and to thereby shift the ejector 39 from the inoperative position of FIG. 1 to the extended position of FIG. 2.

The article 2 which is shown in FIG. 2 constitutes the barrel of a syringe and includes a cylindrical shell or envelope 12 which is provided with a radially outwardly extending flange 20 at its open or rear end and the other end of which is closed by an end wall having a preferably frustoconical hollow extension or tip 17 for the rear end of a hollow needle, not shown. The open rear end of the barrel 2 can receive a plunger which serves to expel a liquid (not shown) from the interior of the shell 12 by way of the central hole of the tip 17 and the needle, for example, into the body of a patient. The envelope or shell 12 of the barrel 2 need not constitute a hollow cylinder.

The first mold section 3 comprises a tubular insert or mold body 14 which is recessed into the main portion of the section 3 so that its exposed end face forms part of the surface 103. The mold body 14 is formed with an axial recess in the form of a cylindrical bore or hole 13 whose axis is normal to the surface 103 and which has an enlarged portion 19 machined into or otherwise formed in the surface 103 and serving to receive plasticized material which is to form the flange 20 of the barrel 2. The enlarged portion 19 constitutes one end of the bore 13, and the other end of this bore is remote from the enlarged portion 19 and is adjacent the flat or slightly concave exposed side of an end wall 15 forming part of the mold body 14 and provided with a slightly conical socket 13a for the material which is to form the tip 17 of the barrel 2. The dimensions of the tip 17 match a prescribed norm so that the hole of this tip can receive the rear end of a needle. If desired or necessary, the tip 17 can be provided with external threads to take a suitable nut. The mold 1 is then provided with suitable means (not shown) for rotating a freshly formed barrel 2 relative to the mold body 14 so as to disengage the standard external threads of the tip from the internal threads in the end wall 15 of the mold body and with suitable means for expelling the externally threaded tip from the socket in the end wall 15.

The enlarged portion 19 at the open end of the bore 13 can constitute a circumferentially complete shallow depression in the surface 103 or it can have a different configuration, e.g., so as to ensure that the open end of the shell 12 of a barrel 2 is provided with two radially outwardly extending lugs which can be used to facilitate manipulation of the syringe.

The mandrel 21 projects beyond the surface 105 of the section 5 and is receivable in the recess or bore 13 with a predetermined play so that the core 21 and the mold body 14 of the section 3 define a tubular cavity 23 (FIG. 1) which is sealed from the atmosphere when the section 5 assumes the operative position of FIG. 1 so that the cavity 23 can receive a supply of plasticized material which is to form a barrel 2. The axis of the core 21 coincides exactly with the axis of the bore 14 so as to ensure that the thickness of the shell 12 will be constant all the way around the axis of the barrel 2. The free end portion of the core 21 supports a pin 25 which extends with play into the socket 13a of the end wall 15 when the section 5 is moved to the operative position of FIG. 1 so that the pin 25 ensures the making of an axial hole in the tip 17 of the finished barrel 2. If desired, the pin 25 or an equivalent can be installed in the wall 15 of the mold body 14. The end portion of the core 21 is then provided with a blind bore or hole for the free end portion of the pin 25 or an equivalent part.

The core 21 is formed with one or more coolant circulating channels 27 which preferably extend close to the free end portion of the core and can receive fresh coolant from a supply conduit 29 (the latter can constitute or include a channel in the mold section 5).

In accordance with a feature of the invention, the means for supplying plasticized material to the cavity 23 between the core 21 and the mold body 14 (in the operative position of the section 5) comprises at least two nozzles 35 which are installed in the section 3 and are aligned with the mold body 14 and recess 13 (i.e., with the mold cavity 23). This means that the nozzles 35 need not extend radially beyond the mold body 14 so that the surface 103 of the section 3 can be provided with a large number (e.g., between two and one hundred two) of bores 13 each of which can receive a discrete core 21 of the section 5 in response to movement of the section 5 from the retracted position of FIG. 2 to the operative position of FIG. 1. Each nozzle 35 is formed with at least two orifices 31 which are parallel to the axis of the mold body 14 and each of which has a discharge end adjacent the end wall 15. The illustrated (two) orifices 31 are elongated channels which are disposed diametrically opposite each other with reference to the axis of the bore 14.

The orifices 31 discharge plasticized material into chambers 34 (see particularly FIG. 3) which are adjacent the end wall 15. The cross-sectional area of each chamber 34 considerably exceeds the cross-sectional area of the respective orifice 31. Each chamber 34 communicates with the mold cavity 23 in the region of the end wall 15. These chambers further communicate with annular compartments 38 which surround the respective orifices 31 in the regions of their discharge ends and are immediately filled with hot plasticized material so as to insulate the streams of plasticized material in the orifices 31 from the adjacent portions of the section 3.

The cross-sectional area of each nozzle 35 can match or approximate the cross-sectional area of the mold body 14.

Figure 3:
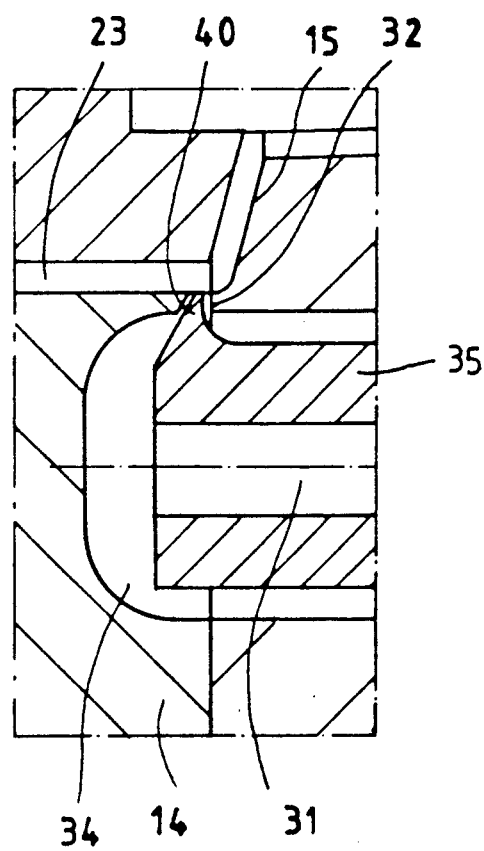
FIG. 3 is an enlarged view of the detail within the circle X in FIG. 1.

The means for supplying plasticized material into the mold cavity 23 further comprises two flow restrictors, one for each of the orifices 31. Each such flow restrictor comprises a port 32 which extends radially of the mold body 14 and connects the respective chamber 34 with the adjacent portion of the cavity 23, and a projection 40 which extends into the port 32. The ports 32 are provided in the mold body 14, and the projections 40 are provided on the respective nozzle 35. The diameters of the ports 32 preferably decrease in directions from the respective chambers 34 toward the cavity 23, i.e., the surfaces bounding such ports throttle the flow of plasticized material into the cavity 23 even if the projections 40 of the nozzles 35 are omitted. Each projection 40 defines with the surface bounding the respective port 32 a substantially annular clearance for the flow of plasticized material into the mold cavity 23. All this is shown in FIG. 3.

If desired or necessary, there can be provided three or more nozzles 35 with orifices 31 which are uniformly distributed around the socket 13a in the end wall 15 of the mold body 14. If the number of orifices 31 is increased, the improved mold 1 even more reliably ensures that the distribution of pressures in the cavity 23 and socket 13a is uniform when the nozzles 35 are called upon to admit plasticized material. This, in turn, even more reliably ensures that the mandrel or core 21 remains in a position of exact coaxiality with the mold body 14 and its bore 14. Each nozzle 35 can be assembled of two or more copper pipes each of which defines an orifice 31.

The means for supplying plasticized material into the orifices 31 of the nozzles 35 includes a support or holder 33 which can be integral with the rear portions of the nozzles, and a distributor 37 which is preferably removably installed in the section 3 and carries the support 33. The distributor 37 can carry two or more supports 33, i.e., two or more discrete series of nozzles 35. The support 33 can be attached to the distributor 37 as well as to the section 3 of the mold 1.

The means for heating the plasticized material which is caused to flow from a main supply channel 43 into the orifices 31 of the nozzles 35 comprises one or more heating elements 41 in the distributor 37 and/or one or more heating elements 141 in the support 33 and/or one or more heating element 241 in each nozzle 35. Thus, the heating means can include a portion in each of the parts 35, 33, 37 or a portion in at least one of these parts. The support 33 is preferably coaxial with the mold body 14. The heating means can include one or more induction heaters, one or more electric resistance heaters or one or more hydraulic or pneumatic heaters. The exact construction of the heating means forms no part of the present invention. It is preferred to employ heating means whose portion or portions do not extend, or do not appreciably extend radially beyond the mold body 14 so as to ensure that a large number of such mold bodies can be installed in the main portion of the section 3 in close or immediate proximity to each other. It is clear that the section 3 is further provided with suitable insulator means for the heating means as well as with means for connecting the heating means with a source of electric energy if the heating means employs one or more current consuming elements.

When the mold 1 is properly installed in the injection molding machine, one of the sections 3, 5 is located at a level above the other section. For example, the section 3 can be disposed at a level above the section 5. The heating elements 41 of the distributor 37 surround the main supply channel 43. The heating elements 141 of each nozzle 35 can be installed in such a way that they surround the orifices 31.

The reference character 36 denotes coolant circulating channels which are provided in the main portion of the section 3 and surround the mold body 14 so as to ensure rapid setting of plasticized material which is to form the barrel 2. Such cooling means need not extend radially well beyond the mold body 14, again for the purpose of ensuring that the mold section 3 can include a large number of such mold bodies, i.e., that the mold 1 can simultaneously produce a substantial number of tubular articles such as the barrel 2 of FIG. 2. The cooling means 36 need not extend axially of the mold body 14 beyond the region B (FIG. 2) where the cavity 23 receives plasticized material from the ports 32, i.e., beyond that portion of the cavity 23 which receives plasticized material to form the tip-supporting end wall of the barrel to be formed as a result of setting of the injected plasticized material.

The section 3 can embody a large number of closely adjacent mold bodies 14 and an equal number of pairs of nozzles 35 because the nozzles 35, their support 33, the heating means for plasticized material in the supplying means, and the cooling means 36 need not extend radially beyond or extend only slightly beyond the respective mold bodies. Moreover, each mold body 14 can cooperate with a discrete core 21 without the danger that heating or cooling of one mold body would thermally affect the neighboring mold body or mold bodies. Moreover, each of one or more mold bodies 14 is readily accessible at the surface 103 of the section 3. As can be seen in FIGS. 1 and 2, the section 3 can be assembled of several modules to facilitate rapid and convenient access to and/or inspection and/or replacement of the mold body or bodies 14, nozzles 35 and support 33. Each mold body 14 is coaxial or at least substantially coaxial with the respective nozzles 35 and support 33, and the cross-sectional area of each mold body need not exceed and need not be appreciably less than the cross-sectional area of the aligned support 33. Compactness of the mold body or bodies and of the associated support or supports constitutes a desirable and advantageous feature of the improved mold.

When the injection of plasticized material into the cavity or cavities 23 of the section 3 is completed (while the section 5 is held in the operative position of FIG. 1), and the injected plasticized material has been caused or permitted to set, the section 5 is moved axially of the bore or bores 13 away from the section 3 to expose the freshly formed barrel or barrels 2 (which are extracted from the respective bores 13 by the cores 21 therewithin), and the moving means 139 is then actuated to shift the ejector 39 to the extended position of FIG. 2 so as to segregate the barrel or barrels 2 from the respective core or cores 21. Extraction of each barrel 2 from the respective bore 14 results in automatic segregation of the tip-carrying wall of the barrel from the still soft plastic material in the respective ports 32. Thus, the barrels 2 do not carry any sprues so that they need not be subjected to any secondary treatment involving separation of sprue subsequent to segregation of barrels from the respective cores. Moreover, this renders it unnecessary to classify and grind the sprue for renewed use in the injection molding machine. The material which fills the ports 32 upon extraction of the barrels 2 from their bores 14 is injected into the respective cavity or cavities 23 upon renewed closing of the mold 1, i.e., after the section 5 reassumes the operative position of FIG. 1.

The improved mold can be used with equal or similar advantage for the making of other types of tubular bodies, such as simple tubes, cartridges for sealing materials, ball point pen housings and many others. All that is necessary is to use suitably configurated mold bodies and cores in order to define cavities for reception of plasticized material which is to form tubular articles of a desired size and/or shape.

Irrespective of the selected size and shape of the mold cavity or cavities in the section 3, the improved mold 1 ensures that the tubular articles which are obtained as a result of setting of plasticized material are not subjected to unpredictable deforming and/or other stresses. This is due to the fact that neighboring mold bodies 14 do not influence each other and that the plasticized material in each of the mold cavities can be subjected to a highly predictable heating as well as to a highly predictable cooling action. Moreover, admission of plasticized material by way of two or more properly distributed ports ensures that each core 21 remains coaxial with the respective mold body so that the mold can turn out barrels having shells or envelopes of constant thickness. This facilitates the application of graduations which are normally provided on the barrels of syringes to indicate the quantity of the confined liquid therein.

Each mold body 14, nozzle 35, support 33 and/or distributor 37 can be rapidly replaced with a fresh part so that eventual damage to or destruction of one or more mold bodies, nozzles, supports and/or distributors entails only a short-lasting interruption of utilization of the improved mold. In other words, it is not necessary to await the end of a shift in order to replace a damaged or destroyed part without unduly affecting the output of the machine.

The feature that the ports 32 admit plasticized material at locations (B) which are remote from the surface 103 of the section 3 is desirable and advantageous because this shortens the paths for the flow of plasticized material from the main supply channel 43 into the cavity or cavities 23. Such shortening of these paths facilitates uniform heating of the stream or streams of plasticized material. Moreover, the heating means need not extend into the regions around the mold bodies where such heating means could interfere with rapid setting of plasticized material in the cavity or cavities.

Still another advantage of the improved mold 1 is that injection of plasticized material into a cavity 23 results in expulsion of air by way of the open end of the respective bore 13, i.e., in the region of the abutting or closely adjacent surfaces 103, 105 so that the outflowing air cannot offer a pronounced resistance to flow of plasticized material into the cavity.

FIG. 2 shows a portion of a second core 21' behind the core 21, and a portion of a second mold body 14' behind the mold body 14.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An injection molding machine comprising a first mold section and a second mold section, said first and second mold sections respectively having confronting first and second surfaces and at least one of said sections being movable between operative and retracted positions in which said surfaces respectively abut and are spaced apart from each other, said first section having at least one substantially cylindrical recess with an open end at the first surface and a second end remote from the first surface, and an end wall at said second end; at least one core having a circumference and provided on and extending from the surface of said second section and being received in said recess with play in the operative position of said one section so that said at least one core and said first surface then define an elongated mold cavity; and means for supplying plasticized material into said cavity, said means for supplying said plasticized material including at least two nozzles carried by said first section adjacent said end wall in line with said recess, each nozzle being substantially coaxial with said recess and having a plurality of orifices for admission of said plasticized material into said cavity at said end wall, said orifices being spaced apart from each other along the circumference of the at least one core in said recess each orifice having a discharge end adjacent the second end of said recess so that the supplied plasticized material flows from said end wall toward said first surface to expel air from the mold cavity at the first surface of said first mold section and to center the at least one core in said recess.

2. The injection molding machine of claim 1, wherein said first section includes a mold body and said mold body defines said recess.

3. The injection molding machine of claim 1, wherein said supplying means further comprises a support for at least two said nozzles each of said nozzles including a portion which is remote from said end wall and at least said portion of said nozzles being affixed to said support.

4. The injection molding machine of claim 1, wherein each nozzle further comprises flow restrictor means defining a path for flow of said plasticized material from said discharge end into said cavity.

5. The injection molding machine of claim 4, wherein each of said flow restrictor means includes a port provided in said first section and communicating with said cavity, and a projection provided on each nozzle, each projection extending into the port of a corresponding flow restrictor means.

6. The injection molding machine of claim 5, wherein each port is disposed substantially radially of said recess.

7. The injection molding machine of claim 1, wherein said supplying means further comprises a support for said at least two nozzles and a distributor which is removably installed in said first section, said support being mounted in said distributor.

8. The injection molding machine of claim 1, wherein said supplying means further comprises a support for said at least two nozzles, said support having a first cross-sectional area and said first section including a mold body which defines said recess and said mold body having a second cross-sectional area equal to or approximating said first cross-sectional area.

9. The injection molding machine of claim 1, wherein said supplying means further comprises heating means for heating the plasticized material, said heating means being adjacent said end wall.

10. The injection molding machine of claim 1, wherein said supplying means further comprises heating means for heating the plasticized material, said first section including a mold body which defines said recess and said heating means being provided in said at least two nozzles substantially in line with said mold body.

11. The injection molding machine of claim 1, wherein said first section includes a mold body which defines said recess, said supplying means further comprising a support for said at least two nozzles and heating means for heating the plasticized material, said heating means being provided in said support substantially in line with said mold body.

12. The injection molding machine of claim 1, wherein said first section includes a mold body which defines said recess, said supplying means further comprising a distributor which is provided in said first section and supports said at least two nozzles, and heating means for heating the plasticized material, said heating means being provided in said distributor.

13. The injection molding machine of claim 1, further comprising cooling means for cooling the plasticized material which is admitted into said cavity, said cooling means surrounding said recess.

14. The injection molding machine of claim 1, wherein said first section has at least one additional recess in said surface thereof, and further comprising at least one additional core provided on said second section and extending into said additional recess in the operative position of said one section to define with said second section an additional cavity, said first section having an additional end wall for said additional recess and further comprising means for supplying plasticized material into said additional cavity.

15. The injection molding machine of claim 1, wherein said end wall has a socket which communicates with said recess to receive plasticized material by way of said orifices.

16. The injection molding machine of claim 1, wherein one of said first and second sections is disposed at a level above the other of said first and second sections.

17. The injection molding machine of claim 1, wherein said recess has an enlarged portion in the surface of said first section.

18. The injection molding machine of claim 1, wherein said supplying means further comprises means for heating the plasticized material during flow into said cavity.

* * * * *